(12) United States Patent
Beevis et al.

(10) Patent No.: US 11,700,851 B2
(45) Date of Patent: Jul. 18, 2023

(54) ANTIVIRAL COMPOSITION FOR TEXTILES

(71) Applicant: INTELLIGENT FABRIC TECHNOLOGIES (NORTH AMERICA) INC, Markham (CA)

(72) Inventors: Giancarlo Beevis, Ontario (CA); Shouhua Niu, Shanghai (CN)

(73) Assignee: INTELLIGENT FABRIC TECHNOLOGY (NORTH AMERICA) INC

( * ) Notice: Subject to any disclaimer, the term of this patent is extended or adjusted under 35 U.S.C. 154(b) by 239 days.

(21) Appl. No.: 17/018,338

(22) Filed: Sep. 11, 2020

(65) Prior Publication Data

US 2022/0079146 A1    Mar. 17, 2022

(51) Int. Cl.
| | |
|---|---|
| *A01N 25/24* | (2006.01) |
| *A01N 47/44* | (2006.01) |
| *C11D 3/00* | (2006.01) |
| *D06M 16/00* | (2006.01) |

(52) U.S. Cl.
CPC ............ *A01N 25/24* (2013.01); *A01N 47/44* (2013.01); *C11D 3/0015* (2013.01); *D06M 16/00* (2013.01); *D06M 2200/00* (2013.01)

(58) Field of Classification Search
CPC ...... A01N 25/24; A01N 47/44; C11B 3/0015; D06M 16/00; D06M 2200/00
See application file for complete search history.

(56) References Cited

FOREIGN PATENT DOCUMENTS

AU    2017204534    *  7/2017  ............. A01N 65/00

* cited by examiner

*Primary Examiner* — Trevor Love

(57) ABSTRACT

The present invention relates to an antiviral composition. The antiviral composition of the invention is applied to textiles to make the textiles virus-resistant before they can be used. The antiviral composition includes an antiviral agent, one or more binding agents and a catalyst or a softener depending upon the utility of the antiviral composition.

3 Claims, 4 Drawing Sheets

ANTIVIRAL COMPOSITION FOR TEXTILES

FIELD OF INVENTION

The present invention generally relates to antiviral compositions. More particularly, the present invention relates to an antiviral composition that can be applied to textiles, and a method for using the antiviral composition as a disinfectant for clothes.

BACKGROUND OF THE INVENTION

Microbes such as virus and bacteria often cling to our clothes and are carried around by us wherever we go. The porous surfaces of textiles tend to hold in moisture and heat, especially when close to the human body, which makes an environment that is exceptionally conducive to the growth of microorganisms. These microbes enter our body when we touch our clothes and have the potential to cause some serious life-threatening diseases. It is thus recommended to treat textiles with antimicrobial substances to keep microbes such as bacteria, fungi, and viruses from flourishing within its fibers.

An AU patent application 2017204534A1 by Columbia University of New York discloses a preservative which is an anti microbial composition that may be used in personal care products including wound care products or in veterinary use. The antimicrobial composition disclosed in the prior art includes poly(Iminoimidocarbonyliminoimidocarbonyl iminohexamethylene) hydrochloride as one of its components that helps in imparting antimicrobial properties to the product. However, the utility of poly(Iminoimidocarbonyliminoimidocarbonyl iminohexamethylene) hydrochloride has not been described in imparting antiviral properties to textiles in particular.

A U.S. Pat. No. 9,708,757B2 by Lipotec SA discloses a process of treatment of textile materials. The patent relates to a process of treatment of textile materials, and their cosmetic or pharmaceutical use or their use as an insect repellent. The prior art does describe utilizing a mixture of a number of chemicals to treat textiles so that they are free from the presence of microbes and insects. However, the prior art does not include poly(Iminoimidocarbonyliminoimidocarbonyl iminohexamethylene) hydrochloride as a part of the composition to treat textiles as such.

Another patent EP1943302 by Kimberly Clark Corp discloses an antimicrobial coating over a portion of an article, wherein the antimicrobial coating includes a mixture of active agents of about 0.05-99.9 wt. % of polyhexamethylene biguanide (PHMB), further wherein the article is a garment, a surgical drape, surgical fenestration or cover, drape, sheet, linen, padding, or gauze dressing.

Though the previously cited prior art includes PHMB as an active ingredient in the antiviral composition. The prior arts still lack the provision of coating the textile through an easy and less time-consuming method such as rinsing and also the presence of another agent which makes the coating more durable.

Therefore to overcome the shortcomings of the prior art, there is a need to provide a more durable and easy to apply antimicrobial composition. This is achieved by making an antiviral composition of the present invention that is durable and is impregnated to textiles simply through laundering.

It is apparent now that numerous methods and systems are developed in the prior art that are adequate for various purposes. Furthermore, even though these inventions may be suitable for the specific purposes to which they address, accordingly, they would not be suitable for the purposes of the present invention as heretofore described. Thus, there is a need for a more durable and effective antiviral composition for textiles.

SUMMARY OF THE INVENTION

The present invention generally relates to an antiviral composition for the purpose of disinfecting textiles. The primary objective of the present invention is to provide an antiviral composition that can be impregnated into the surface of a textile through the pores to impart antiviral properties to the textile. The imparted antiviral properties are long lasting. The process of making the textile free from any kinds of viruses includes dipping the textile into the antiviral solution followed by pressing the antiviral composition into the textile fibers through a nip roller. After dipping the textile into the antiviral composition, the textile is dried and cured using heat and/or pressure.

Another objective of the invention is to provide an antiviral composition that allows for antiviral properties that remain durable to washing.

Yet another objective of the invention is to provide an antiviral composition that can be used as an antiviral laundry additive. The antiviral laundry additive can be simply poured into a washer's softener dispenser tray during its rinse cycle to make the clothes resistant to viruses.

In the present invention, the antiviral composition to be impregnated into the textile includes an antiviral agent which includes poly(Iminoimidocarbonyliminoimidocarbonyl iminohexamethylene) hydrochloride, at least one binding agents that may include Non-Ionic Trimethylolmelamine Resin and Cationic Trimethylolmelamine Resin and a catalyst such as Magnesium chloride solution. The quantity of each of the three components of the mixture is so chosen so as to produce a novel antiviral composition that gives antiviral properties to textiles.

A slightly different antiviral composition is preferred when the composition is to be used as a laundry additive. The major components of the composition include an antiviral agent which is poly(Iminoimidocarbonyliminoimidocarbonyl iminohexamethylene) hydrochloride, at least one binding agent that may include Non-Ionic Trimethylolmelamine Resin or Cationic Trimethylolmelamine Resin and a softening agent such as amino modified silicone-polyether copolymer.

Another objective and aspect of the invention includes forming an antiviral composition to be imparted into the textile includes an antiviral agent which includes poly(Iminoimidocarbonyliminoimidocarbonyl iminohexamethylene) hydrochloride is about 1.5%, a number of binding agents that may include Non-Ionic Trimethylolmelamine Resin about 5% and Cationic Trimethylolmelamine Resin about 3% and a catalyst such as Magnesium chloride solution in about 1.8%.

Other objectives and aspects of the invention will become apparent from the following detailed description, taken in conjunction with the accompanying drawings, which illustrate, by way of example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION

The present invention generally relates to an antiviral composition for the purpose of disinfecting textiles. The antiviral composition can be impregnated into the surface of a textile through the pores to impart antiviral properties to the textile. The imparted antiviral properties are long lasting. The process of making the textile resistant to any kinds of viruses includes dipping the textile into the antiviral solution followed by pressing the antiviral composition into the textile fibers through a nip roller. After dipping the textile into the antiviral composition, the textile is dried and cured using heat and pressure.

Figure 1:
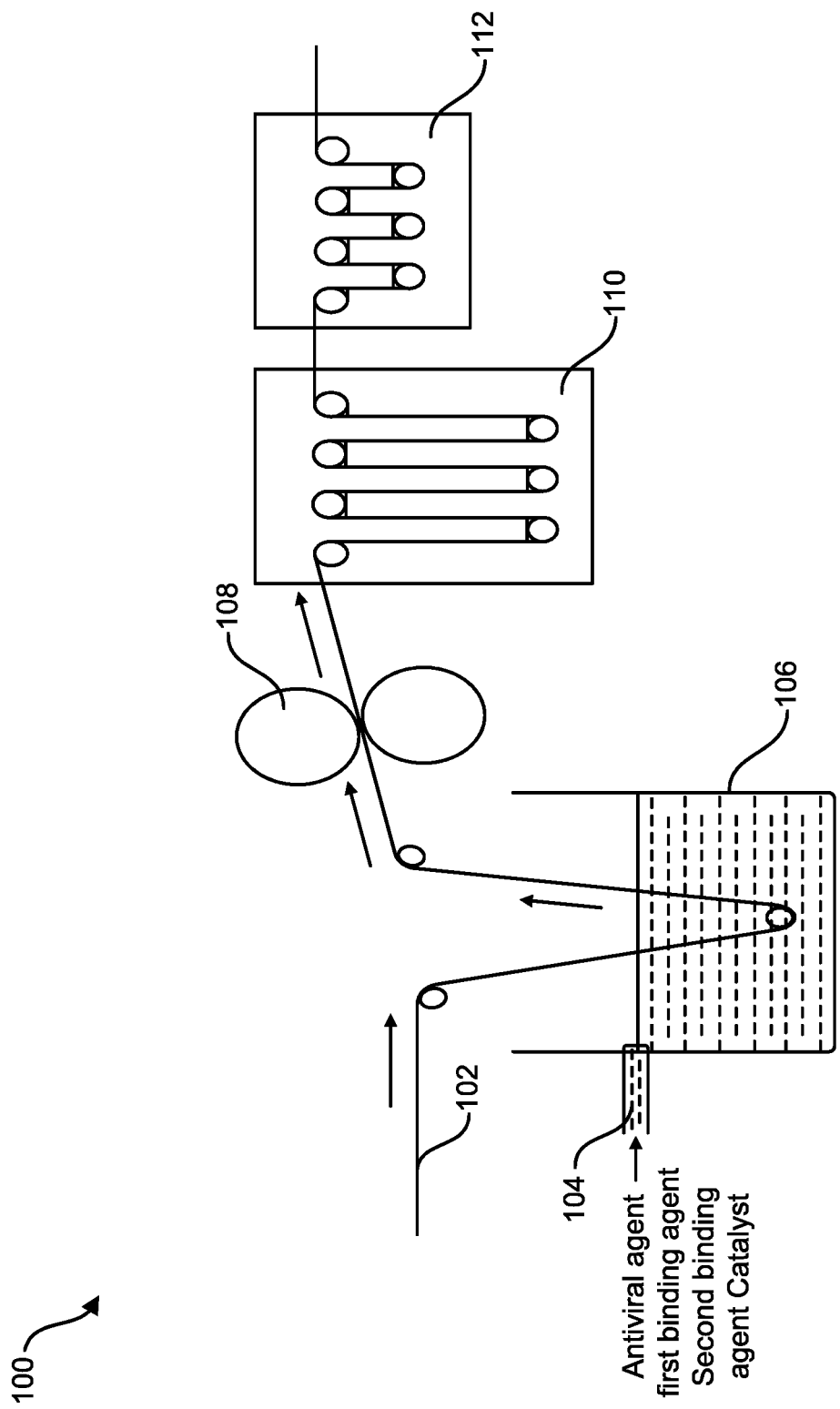
FIG. 1 illustrates a system using an antiviral composition for imparting antiviral properties to textiles as described in the present invention.

FIG. 1 illustrates a system and an antiviral composition provided to impart antiviral properties to textiles described in the present invention. The system includes a textile 102 that needs to be treated, a dipping unit 106a for soaking the cloth in the antiviral agent solution 104, a nip roller 108 for squeezing the extra load of antiviral agent, a drying unit 110 for drying out the cloth with imparted antiviral properties and a curing unit 112 for curing the impregnated textiles. The textile is dipped into an antiviral solution 104 containing chemicals with antiviral materials.

In primary embodiment, the antiviral solution 104 disclosed herein includes an antiviral agent poly(Iminoimidocarbonyliminoimidocarbonyl iminohexamethylene) hydrochloride with one or more binding agents such as Cationic Trimethylolmelamine Resin and Non-Ionic Trimethylolmelamine Resin and a catalyst which includes a solution of magnesium chloride.

In another embodiment, the antiviral solution 104 includes the antiviral agent poly(Iminoimidocarbonyliminoimidocarbonyl iminohexamethylene) hydrochloride around 1.5%, multiple binding agents such as Cationic Trimethylolmelamine Resin 5% and Non-Ionic Trimethylolmelamine Resin 3% and optionally to include a catalyst which can be a solution of magnesium chloride.

In yet another embodiment, the antiviral solution 104 disclosed herein includes the antiviral agent poly(Iminoimidocarbonyliminoimidocarbonyl iminohexamethylene) hydrochloride around 1.5%, one or more binding agents such as Cationic Trimethylolmelamine Resin 5% or Non-Ionic Trimethylolmelamine Resin 3% and a catalyst around 1.8% which is a solution of magnesium chloride.

After dipping the textile into the solution for roughly 5-6 minutes in dipping unit 106a, the textile 102 is taken out of the solution for the antiviral 104 composition to be impregnated into the textile 102 via a nip roller 108.

In general, nip rollers 108 are used to press two or more sheets together to form a laminated product. The high pressure created at the nip point brings the sheets into intimate contact, and can squeeze out any bubbles or blisters that might cause a defective bond. Here, a nip roller is used to press the antiviral composition 104 into the textile 102 so that the chemical gets impregnated into the textile fibers of the textile uniformly.

The textile 102 is dried in the drying unit 110 using heat with or without pressure at a temperature of approximately 150 C for roughly a minute and a half to completely remove the moisture from the textile 102. This is followed by curing operation in the curing unit 112.

The curing operation consists of baking a garment or a garment section in a heated chamber to either set a crease in the fabric permanently or to decompose auxiliary media used as a sewing aid. For example, a curing operation permanently sets previously pressed creases in certain permanent press, durable press, and wash-wear garments. The curing is basically a finishing process applied to textiles for imparting different finish treatments, such as waterproofing, softening, antibacterial or anti-odor finishes. The duration for curing the textile 102 depends upon the weight of the textile and its type.

Figure 2:
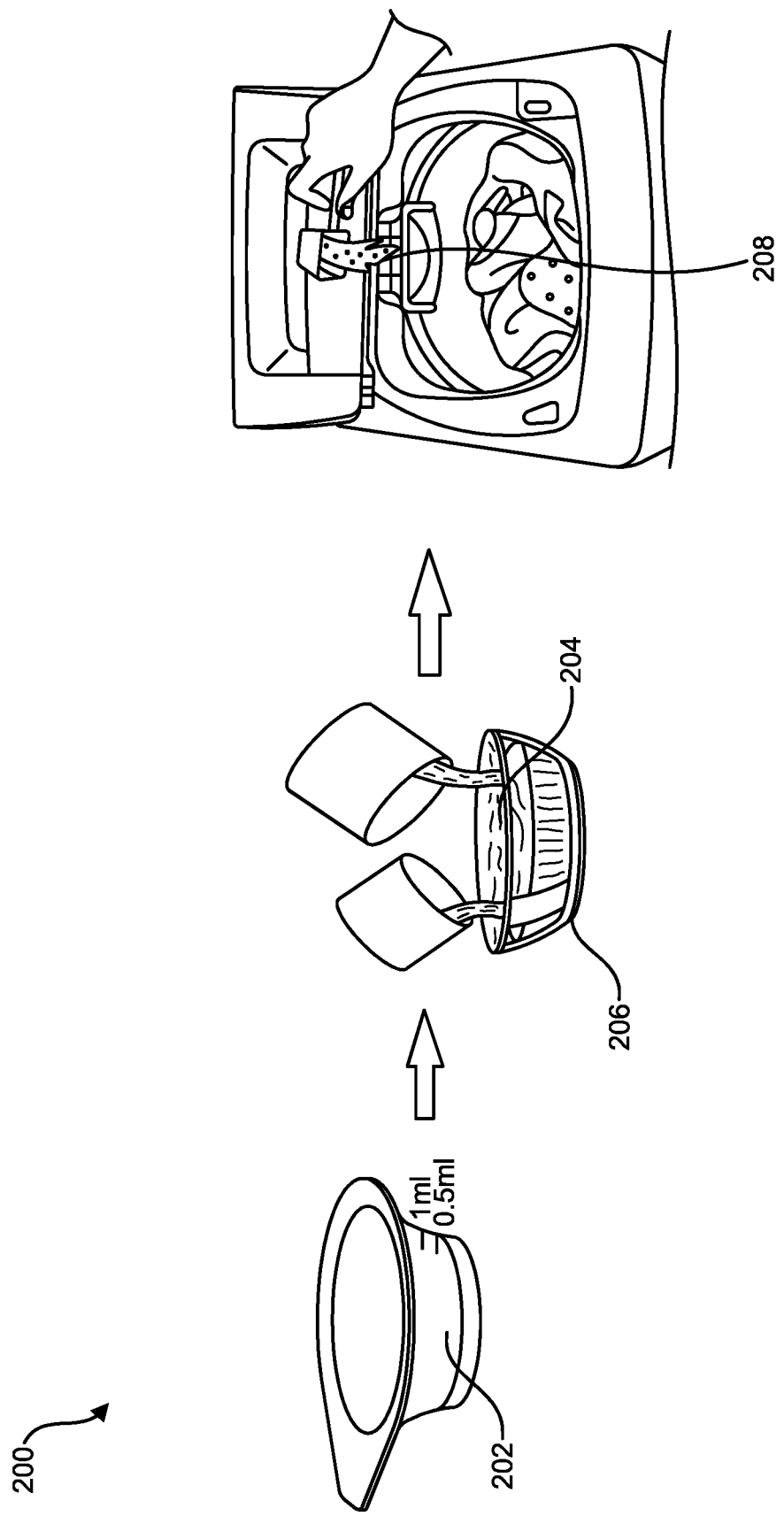
FIG. 2 illustrates a system using an antiviral composition for impart antiviral properties to textiles in a final rinse cycle.

FIG. 2 illustrates a system 200 for a rinse cycle where the antiviral composition is used to rinse the clothes with clean water. The system includes a measuring bowl or tool 202 to measure the composition ingredients, and a mixing unit to mix 1-2% of the antiviral additive 204 with 78-79% softener and 20% clean water. The measured ingredients i.e. the antiviral additive 204, are mixed in a mixture unit 206, and the chemical composition is recommended to be measured, such as used by a cap, followed by pouring the chemical composition into the softener dispenser tray 208 of the machine.

The rinse cycle on the washer is when that the machine simply rinses the clothes with clean water. It is a quick cycle that requires no detergent and runs automatically after most other wash cycles. During this cycle, the antiviral additive composition 204 including Poly(Iminoimidocarbonyliminoimidocarbonyl iminohexamethylene) hydrochloride, binding agents such as Cationic Trimethylolmelamine Resin and Non-Ionic Trimethylolmelamine Resin and a softener such as aminomodified silicone-polyether copolymer is used to disinfect the clothes with the chemical composition provided.

Figure 3:
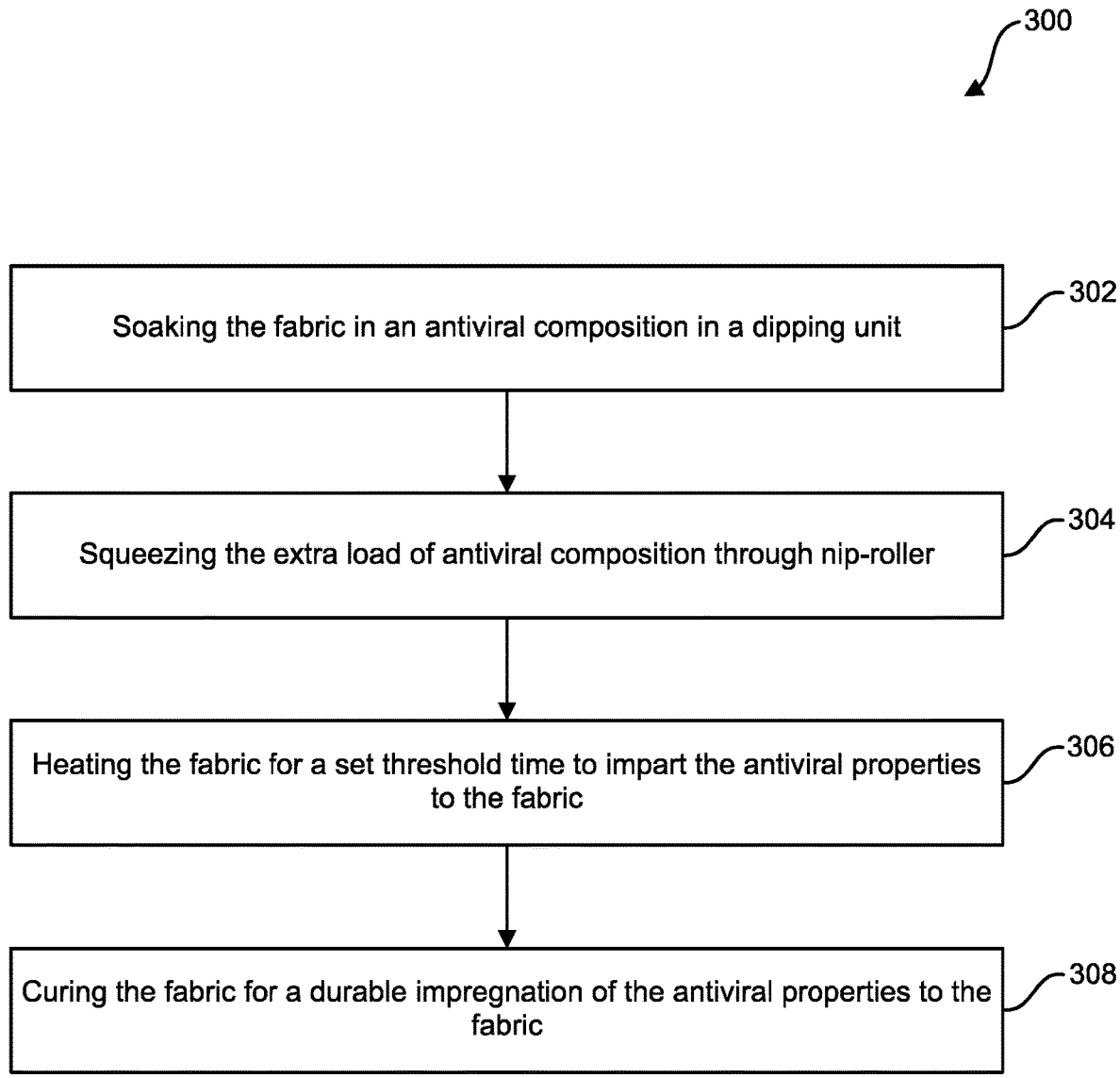
FIG. 3 illustrates a method using the antiviral composition applied to textiles for imparting antiviral properties.

FIG. 3 illustrates a method 300 applied to textiles for imparting antiviral properties to the textiles. The process is a Pad-Dry-Cure process. The Pad-Dry-Cure process is applied to textiles to impart antiviral properties. In this process, the cross-linking reactant, the catalyst, the softener, and other components are dried on the textile prior to the cross-linking reaction that takes place during the curing operation. The padding operation consists of two essential steps. The first step includes thorough impregnation by immersion of the absorbent textile in a chemical solution containing an antiviral. This is followed by a second step that includes squeezing of the wet textile between rollers. The cloth to be padded is taken up by either from the folded form or from the batched condition, and fed to the padding machine over a set of guide rollers.

The method involves soaking the textile in the mixing unit 302. The textile is dipped into an antiviral solution containing chemicals with antiviral materials. The antiviral solution disclosed herein includes the antiviral agent poly(Iminoimidocarbonyliminoimidocarbonyl iminohexamethylene) hydrochloride. After dipping the textile into the solution for roughly 5-6 minutes, the textile is taken out of the solution for the antiviral composition to be impregnated into the textile via a nip roller 304.

The nip roller is used to press the antiviral composition into the textile so that the chemical gets impregnated into the textile uniformly. The nip roller is involved in the padding and drying process of the pad-dry cure technique. The nip roller presses the antiviral composition into the fabric to impart antiviral properties and removes the extra load of antiviral composition by squeezing the textile and thus helping in the drying of the textile.

The textile is then dried in the drying unit 306 to completely remove the moisture from the textile and is then cured by baking the textile using heat with or without pressure at a temperature of approximately 150 degree C. 308 for roughly a minute and a half. The duration for curing the textile depends upon the weight of the textile and its type.

Figure 4:
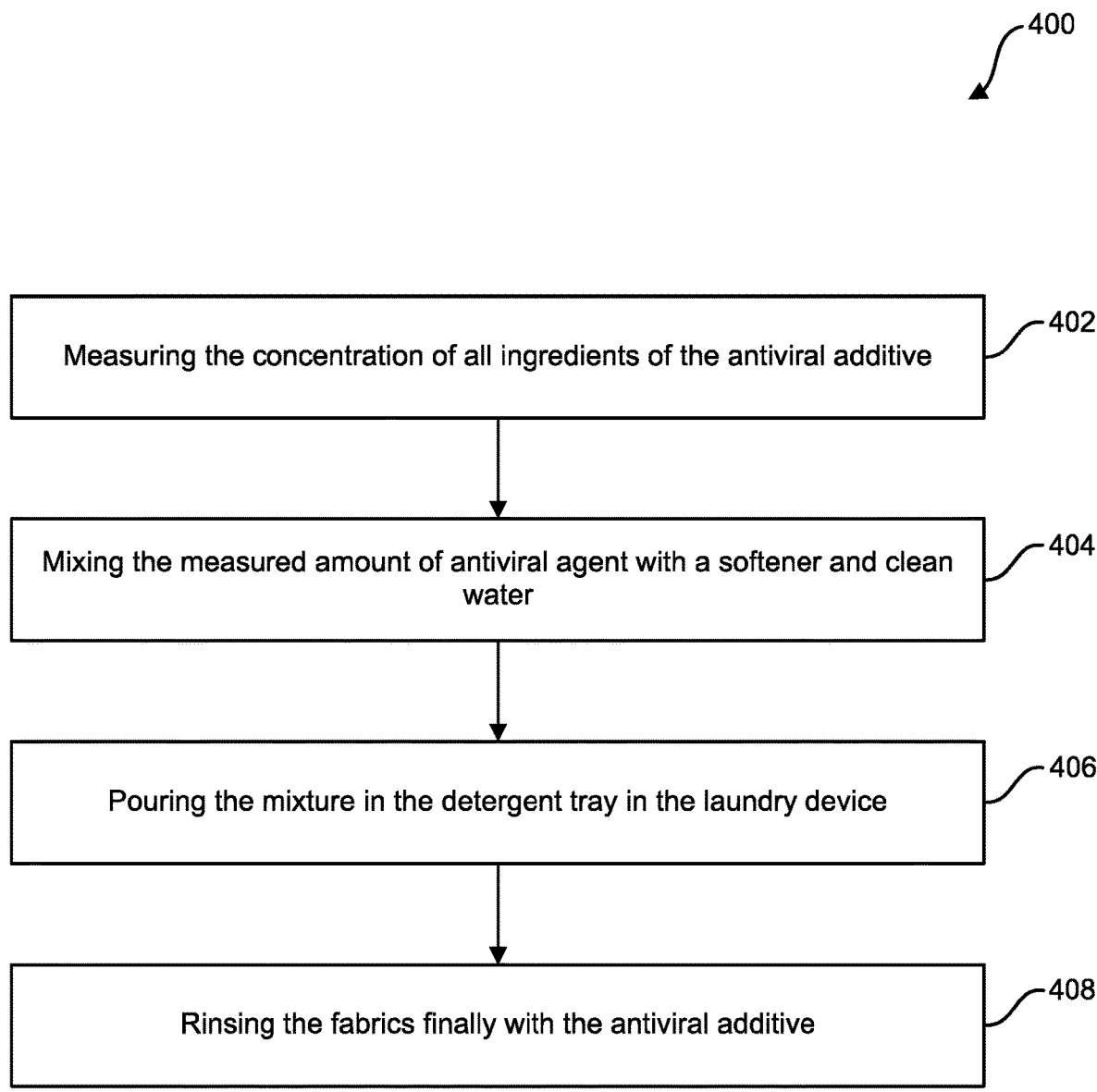
FIG. 4 illustrates a method using the antiviral composition in a final rinse cycle.

FIG. 4 illustrates a method 400 for final laundering cycle where the antiviral composition is used to rinse the clothes with clean water. A rinse cycle on the washer is when that the machine simply rinses the clothes with clean water. It is a quick cycle that requires no detergent and runs automatically after most other wash cycles.

During this cycle, the antiviral composition including Poly(Iminoimidocarbonyliminoimidocarbonyl iminohexamethylene) hydrochloride and a softener such as aminomodified silicone-polyether copolymer is used to disinfect the clothes with the chemical composition provided. The method involves measuring the amount of the chemical composition 402 that is recommended to be used, by a cap; later mixing all the ingredients of the composition in the mixing unit 404; followed by pouring the chemical composition into the softener dispenser tray 406 of the machine and finally rinsing the textiles with the antiviral additive 408.

While, the various embodiments of the present invention have been described above, it should be understood that they have been presented by way of example only, and not of limitation. Likewise, the figures may depict an example architectural or other configuration for the invention, which is done to aid in understanding the features and functionality that can be included in the invention. The invention is not restricted to the illustrated example architectures or configurations, but the desired features can be implemented using a variety of alternative architecture and configurations.

Although, the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

The invention claimed is:

1. An antiviral corn position for imparting antiviral properties to textiles, wherein the antiviral composition comprises:
   an-anti viral agent which is about 1-2% by weight, wherein the antiviral agent is poly(Iminoimidocarbonyliminoimidocarbonyl iminohexamethylene) hydrochloride,
   a plurality of binding agents, wherein the plurality of binding agents includes:
      a first binding agent which is about 2-7% by weight, wherein the first binding agent cationic trimethylolmelamine resin;
      a second binding agent which is about 2-5% by weight, wherein the second binding agent is non-ionic trimethylolmelamine resin; and
   a catalyst which is about 1-2% by weight, wherein the catalyst is a magnesium chloride solution.

2. The antiviral composition according to claim 1, wherein the textile can be either of bolts of fabric, shirts, pants, blankets, bed sheets, jackets or coats.

3. A method of using an antiviral composition for cleaning and disinfecting textile fabrics, wherein the method comprises:
   dipping textile fabric into antiviral chemical composition of claim 1, wherein the active component poly(Iminoimidocarbonyliminoimidocarbonyl iminohexamethylene) hydrochloride is about 1.5% in composition; and
   impregnating the antiviral chemical composition, wherein the impregnation is performed by pressing the antiviral chemical composition into the fabric via a nip roller.

* * * * *